INVENTOR
HERMANN BITTER

United States Patent Office 3,583,071
Patented June 8, 1971

3,583,071
METHOD AND APPARATUS FOR MEASURING UNDERCUT DEPTH OF TEETH
Hermann Bitter, Osnabruck, Germany, assignor to Bios-Gesellschaft Hermann Bitter, Osnabruck, Germany
Filed Dec. 3, 1968, Ser. No. 780,635
Claims priority, application Germany, Dec. 7, 1967, P 15 66 197.9
Int. Cl. A61b 5/10
U.S. Cl. 33—174     3 Claims

ABSTRACT OF THE DISCLOSURE

In a method for measuring and marking the undercut depth of teeth, in the course of manufacturing prosthesis clamps for fastening partial dental prostheses, a measuring feeler is manipulated to scan a desired undercut depth, and the measuring feeler is then utilized to mark the measuring point. The supporting tooth for the clamp may be coated or sprayed with a substance providing visible marking under the influence of heat, and the measuring feeler is then heated during measuring of the desired undercut depth. In such a case, the apparatus for performing the method may include a measuring feeler in the form of a resistance wire for electric heating. A time relay may limit the heating time to a predetermined magnitude. The measuring point may be marked by a drawing pencil included in the measuring feeler.

BACKGROUND OF THE INVENTION

In the manufacture of partial dental prosthesis, which are to be fastened by means of clamps, it is necessary to measure those teeth which are to serve as supports for the clamps. This is necessary in order to install the clamp preperly with the proper clamping effect. The measuring process is effected in a manner which will now be described.

First, the jaw model is fastened in the holding device of the parallelometer table, and the model is lined up for the direction of arrangement of the subsequent prosthesis. Following this, the so-called "total equator" is marked on the teeth designed to receive the clamps. This "total equator" is the outermost peripheral line of the teeth in question. Such marking may be effected in a relatively simple manner by guiding, around the teeth in question, a drawing lead which is in a vertical position.

Subsequently, the so-called "undercut depth" is measured. This is a predetermined measured amount by which the tooth recedes below the over-all or total equator. Ascertaining a predetermined undercut depth is thus extremely important, because the first and secure fit of a prosthesis is assured only if the ends of the clamp arms are arranged on the fastening or supporting teeth in the areas of these teeth which have a defined and predetermined undercut depth.

Up to the present, measuring of the undercut depth has been effected by means of a measuring device associated with a parallelometer table. This measuring device is provided with a directly readable scale or dial, or with measuring disk pins of a certain predetermined disk size. The measuring point which are found have to be marked on the tooth with a pencil or similar crayon.

In addition to this method of measuring and marking being very complicated, since the measuring device has to be operated with one hand while the other hand has to manipulate the pencil or crayon, the known method is particularly disadvantageous because only the approximate measuring point can be recorded. This is because the measuring feeler first must be withdrawn from the place of measurement in order to provide space for the pencil or crayon. This, of course, may result in considerable inaccuracies.

SUMMARY OF THE INVENTION

This invention relates to the measurement and marking of the undercut depth of teeth in the course of producing prosthesis clamps for the fastening of partial dental prostheses and, more particularly, to an improved and simplified method and apparatus for such measurement and marking.

In accordance with the invention, a desired undercut depth is scanned or felt by means of a measuring feeler, after which the measuring feeler itself is used to mark the measuring point. In the inventive method, it is particularly advantageous to coat or spray the fastening or support tooth, which is to be measured and clamped, with a substance which provides a visible marking under the effect of heat, and to heat the measuring feeler when measuring the desired undercut depth.

In practicing the inventive method, the person effecting the measuring can concentrate completely on the accurate measurement of the undercut depth and, at the moment of feeling the correct undercut depth, has only to operate an actuating device for heating the measuring feeler in order to achieve absolutely accurate marking of the desired measuring point.

Apparatus particularly suitable for performing the method includes a measuring feeler, of a measuring device for measuring the undercut depth, in the form of a resistance wire which, when current flows through it, may be heated to the point where it will mark or indicate, on the substance which has been applied to the fastening tooth, a visible indication. When scanning or feeling the accurate undercut depth, it is then necessary only to actuate an electrical switch, preferably a foot-operated switch, in order to effect marking of the measuring point.

It is advantageous to provide a time relay which, when the resistance wire is energized, limits the heating time to a predetermined value so that undesired heating of the measuring device or of the fastennig or support tooth is avoided.

The marking may be effected by means of a measuring feeler of a different type. For example, a drawing pencil may be arranged within the measuring feeler of a measuring device for measuring the undercut depth, with the pencil preferably being arranged in the center of the feeler and being capable of projection. This pencil is then projected as soon as the accurate measuring point has been found.

An object of the invention is to provide a method for measuring and marking the undercut depth of teeth, in the course of manufacturing prosthesis clamps for fastening partial dental prostheses, which is easy to perform and which guarantees accurate measurement and marking.

Another object of the invention is to provide an apparatus for performing such method.

A further object of the invention is to provide such a method including the step of initially coating the supporting tooth or teeth to be measured with a substance which, when heated, provides a visible marking, and then heating the measuring feeler when the desired undercut depth has been found.

Another object of the invention is to provide such a method and apparatus in which the measuring feeler is in the form of an electrical resistance and operatively associated with selectively connectable electric energizing means.

A further object of the invention is to provide such a method and apparatus in which the marking is effected by a projectable pencil or the like displaceable centrally of the measuring feeler and normally retracted.

A further object of the invention is to provide such a method and apparatus in which the person carrying out the measuring can concentrate completely on the accurate measuring of the undercut depth and, at the moment of feeling the correct undercut depth, has only to release an actuating device effective to mark the desired measuring point.

For an understanding of the principles of the invention, reference is made to the following description of typical embodiments thereof as illustrated in the accompanying drawings.

DESCRIPTION OF THE PREFERRED EMBODIMENTS

Figure 1:
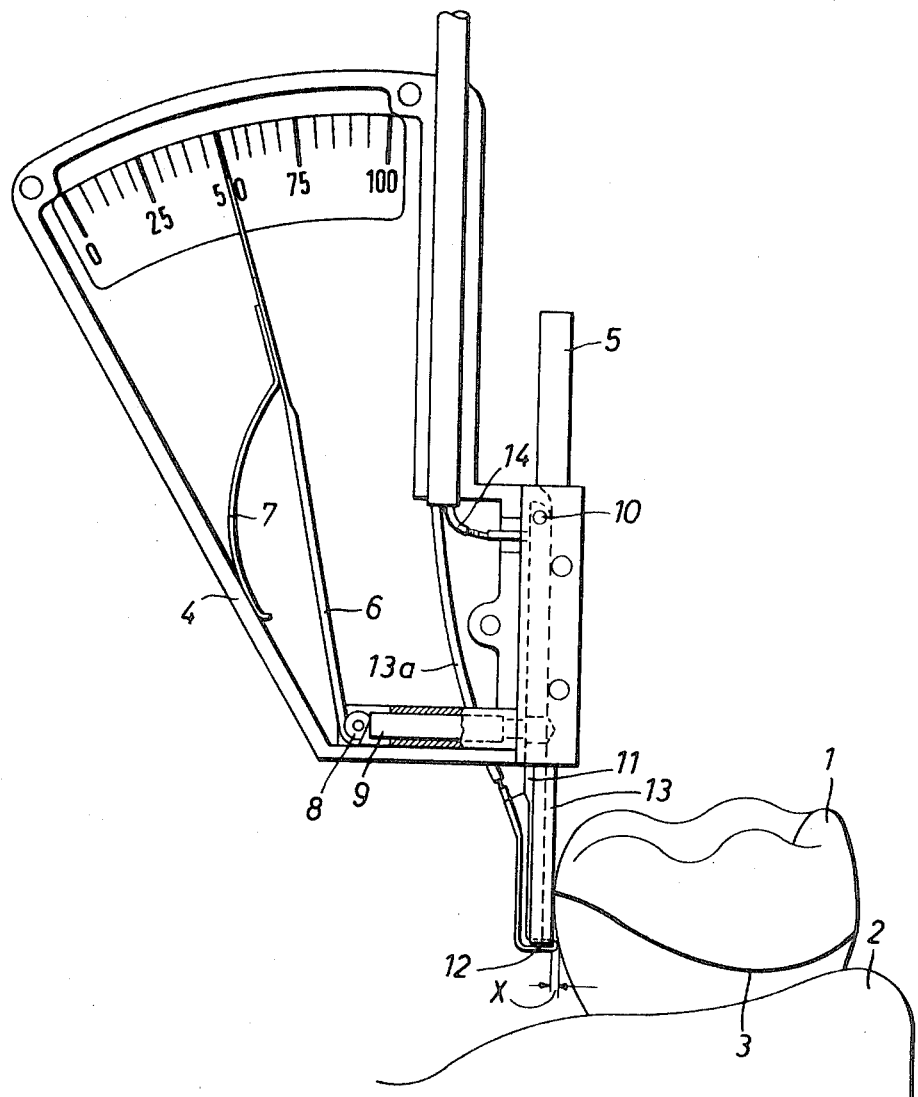
FIG. 1 is a somewhat schematic elevation view of one form of apparatus for performing the method of the invention, the apparatus being shown in its measuring position.

In the drawings, an over-all or total equator 3 has been indicated on a fastening or supporting tooth 1 of a jaw model 2. A measuring device 4 is fastened, in proper vertical orientation, to the parallelometer arm by means of a vertically oriented bolt 5.

Measuring device 4 comprises an indicator 6 which, under the bias of a spring 7, is pressed into the maximum indicating position. The lower end of indicator 6 is connected to a cam 8 which is actuated by a plunger 9. Plunger 9, in turn, is actuated by an element or member 11 which is swingable about a pivot 10. At its lower end, member 11 carries a measuring feeler 12 in such a manner that measuring feeler 12 may be moved back and forth essentially horizontally relative to a vertically and downwardly extending pin 13 which abuts against the tooth 1 at the equator 3. During such essentially horizontal movement of measuring feeler 12, indicator 6 is actuated.

In FIG. 1, measuring feeler 12 is in the form of a resistance wire which is heated by supply lines 13a and 14 which are insulated relative to the housing of the measuring device. Preferably, a foot-operated switch (not shown) is included in the supply circuit of measuring feeler 12, so that the resistance wire comprising measuring feeler 12 may be heated without the person operating the measuring device having to use his hands. This person is thereby able to devote his complete attention to the actual measuring procedure.

The apparatus illustrated in FIG. 1 is operated in the following manner. After coating fastening or supporting tooth 1 with a substance which will provide a visible indication under the effect of heat, pin 13 of the measuring device is brought into contact with tooth 1, and tooth 1 is scanned or felt by the measuring feeler 12. At first, measuring feeler 12 is at its maximum extended position relative to pin 13, and is retracted until the desired undercut depth X is indicated by the measuring device. As soon as this occurs, measuring feeler 12 is heated by closing the foot-operated switch, and this results in a marking of the measuring point which has been determined.

Preferably, a time relay is included in the supply circuit for the measuring feeler in such a manner that, when the resistance wire is energized, the heating time is limited to a predetermined value or magnitude so that undesirable overheating is avoided.

Figure 2:
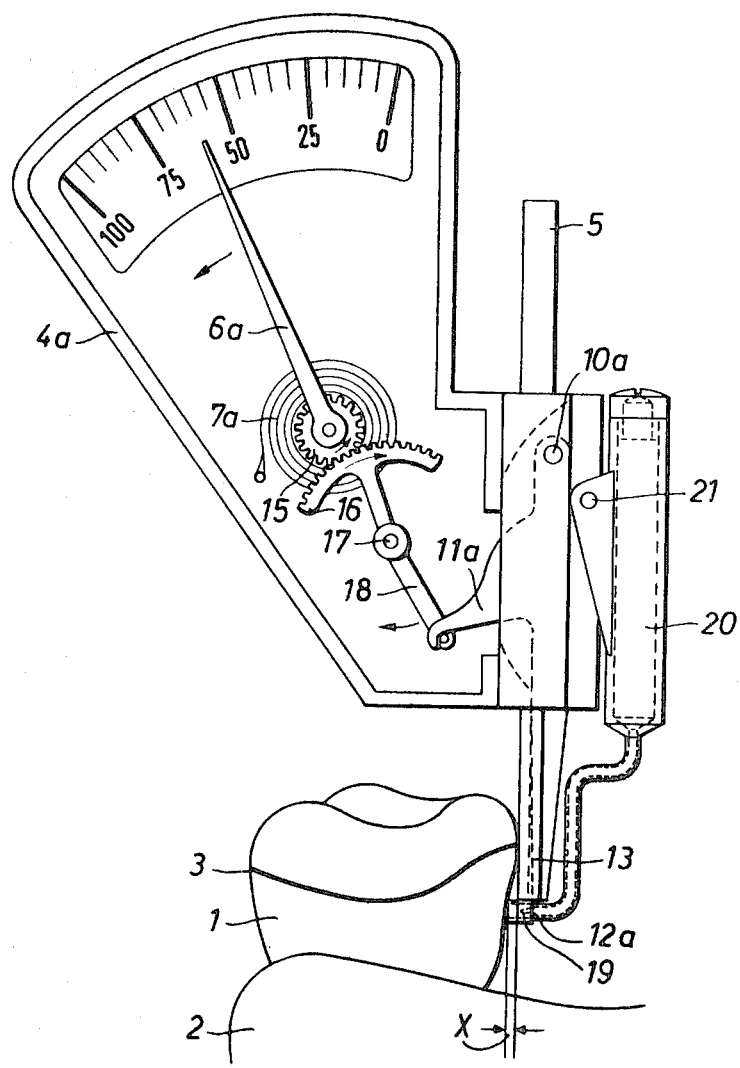
FIG. 2 is a view similar to FIG. 1 showing a modified embodiment of the apparatus.

Referring to FIG. 2, the embodiment of the invention shown therein operates completely and entirely mechanically. In this embodiment of the invention, measuring indicator 6a of the device is biased toward the maximum indicating position by means of a helical spring 7a. Indicator 6a is movable with a pinion or gear 15 which is engaged with a gear segment 16 pivoted at 17 and having a second extension arm 18. Arm 18 is connected to a member 11a which is swingable, relative to the housing of the device, about a pivot 10a. At its lower end, member 11a carries measuring feeler 12a which may be moved back and forth in an essentially horizontal direction relative to vertical pin 13, during which movement indicator 6a is actuated.

Measuring feeler 12a is of hollow construction and comprises, in its center, a drawing pencil 19 which is fed by a cartridge 20. Cartridge 20 oscillates about a pivot 21 on the housing, and drawing pencil 19 is rigidly connected to cartridge 20 in such a manner that, when the lower end of cartridge 20 is swung in the direction toward the measuring device, drawing pencil 19 projects out of the front end of measuring feeler 12a and marks the measuring point on tooth 1, as soon as the desired undercut depth has been found in the manner described above in connection with the embodiment of FIG. 1.

What is claimed is:

1. In apparatus for measuring and marking of the undercut depth of teeth, in the course of manufacturing prosthesis clamps for fastening partial dental prostheses, using a measuring device and a manipulatable measuring feeler, operatively associated with the measuring device, to scan a desired undercut depth of a tooth; the improvement comprising marking means included in said measuring feeler and selectively operable, while said measuring feeler is maintained stationarily engaged with the measuring point, to mark the measuring point, in which said marking means comprises heating means operable to heat said measuring feeler to provide a visible mark on a heat sensitive coating on the tooth.

2. Apparatus for measuring and marking of the undercut depth of teeth, as claimed in claim 1, in which said heating means comprises an electric resistance wire; and supply conductors connected to said wire and selectively operable to connect said wire to a source of electric potential.

3. Apparatus for measuring and marking of the undercut depth of teeth, as claimed in claim 2, including a time relay connected to said supply conductors and effective, responsive to energization of said resistance wire, to limit the heating time of said measuring feeler.

References Cited

UNITED STATES PATENTS 2,635,347   4/1953   Gelfand   33—174

FOREIGN PATENTS 908,458   4/1954   Germany   33—18

LEONARD FORMAN, Primary Examiner

A. J. MIRABITO, Assistant Examiner

U.S. Cl. X.R.

33—172